United States Patent

Wakabayashi et al.

[11] Patent Number: 6,084,897
[45] Date of Patent: Jul. 4, 2000

[54] LASER PROCESSING DEVICE AND LASER DEVICE

[75] Inventors: Osamu Wakabayashi, Oyama; Tetsuo Shakushi, Komatsu, both of Japan

[73] Assignee: Komatsu, Ltd., Tokyo, Japan

[21] Appl. No.: 09/029,490

[22] PCT Filed: Sep. 2, 1996

[86] PCT No.: PCT/JP96/02467

§ 371 Date: Feb. 26, 1998

§ 102(e) Date: Feb. 26, 1998

[87] PCT Pub. No.: WO97/07926

PCT Pub. Date: Mar. 6, 1997

[30] Foreign Application Priority Data

Aug. 31, 1995 [JP] Japan .................................... 7-223908
Apr. 17, 1996 [JP] Japan .................................... 8-095531

[51] Int. Cl.[7] .......................................................... H01S 3/00
[52] U.S. Cl. ............................. 372/38; 372/33; 372/29
[58] Field of Search ............................... 372/38, 33, 57

[56] References Cited

U.S. PATENT DOCUMENTS 5,260,961 11/1993 Zhou et al. ............................... 372/57
5,661,744 8/1997 Muraakami et al. ................... 372/38

FOREIGN PATENT DOCUMENTS 63-55992 3/1988 Japan .
1-210183 8/1989 Japan .
1-278982 9/1989 Japan .
1-278982 11/1989 Japan .

OTHER PUBLICATIONS

John D. Cuthbert, "Optical/Laser Microlithography V," in the Proceedings of SPIE—The International Society for Optical Engineering, pp. 473–485 and including cover page, copyright page & Table of Contents iii–viii (1992).

Primary Examiner—Leon Scott, Jr.
Attorney, Agent, or Firm—Varndell & Varndell, PLLC

[57] ABSTRACT

A burst-on/off signal transmitting means which generates a burst-on signal for starting continuous-wave oscillation of a laser and a burst-off signal for starting stopping the continuous-wave oscillation and transmits the signals to the laser is provided on the processing device side. Control means which receives the burst-on/off signals and controls burst operation by using the signal is provided on the laser side. The charging control is not needed while the laser does not oscillate. Therefore, the safety of the laser is ensured. The output of the laser is controlled to a fixed level with high accuracy, and the responsivenesses of the other controls and the control speed are improved.

16 Claims, 8 Drawing Sheets

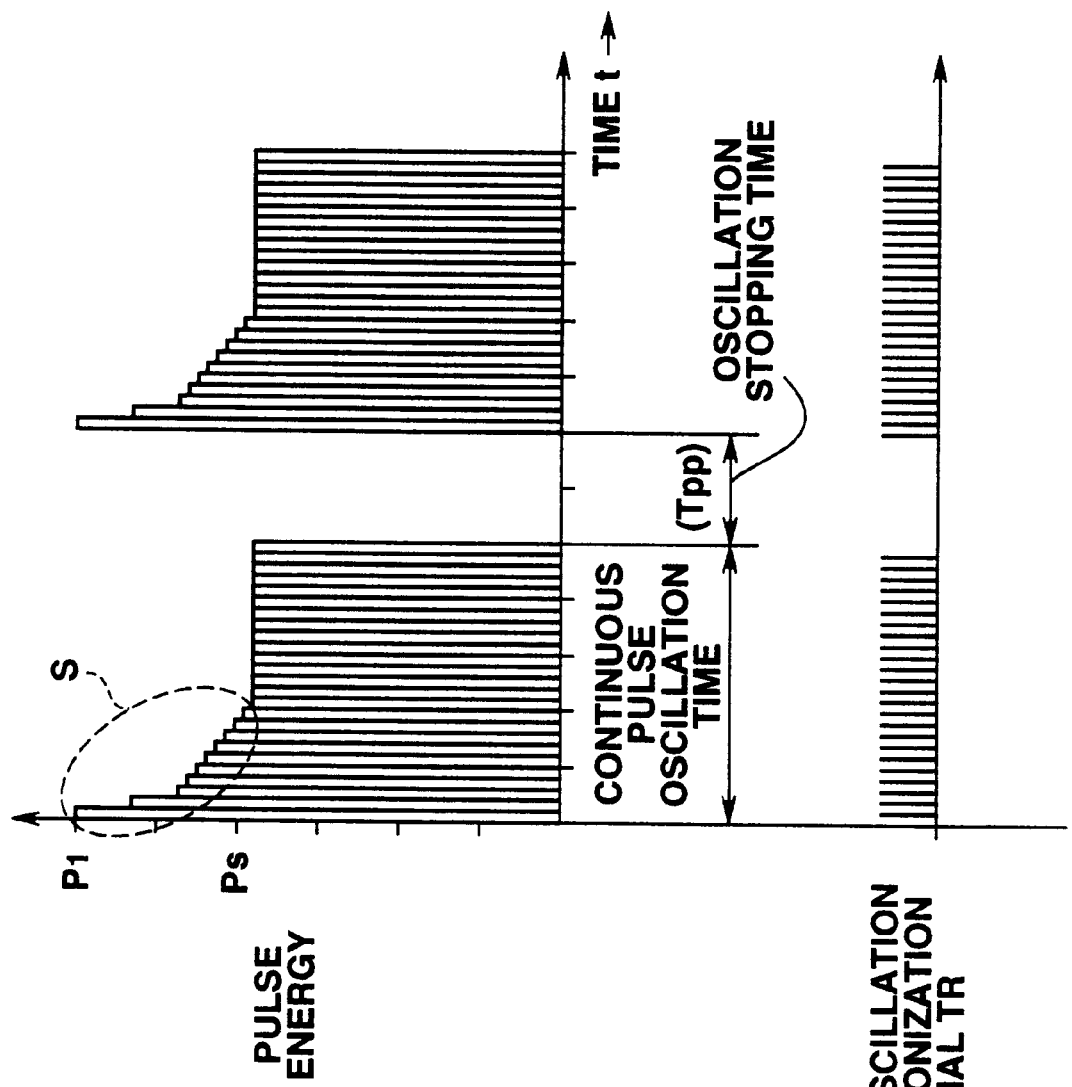

LASER PROCESSING DEVICE AND LASER DEVICE

TECHNICAL FIELD

The present invention relates to a laser processing device comprising a laser device which performs a burst operation, and a processing device which subjects a semiconductor, macromolecular material, or inorganic material to a predetermined type of work using the laser light produced from the laser device.

BACKGROUND ART

In reduction projection exposure devices (referred to as "steppers" hereinbelow) which use a laser to carry out the exposure processing of a circuit pattern, the amount of exposure needs to be strictly controlled in order to maintain the resolution of the circuit pattern above a certain level. On the other hand, because the excimer lasers used as light sources for such steppers are what are known as pulse-discharge excitation gas lasers, the pulse energy of every pulse varies, and there is a need to reduce this variation in order to improve the precision with which the amount of exposure is controlled.

Thus, as seen in the literature (Miyachi et al, "Excimer Laser Lithography", Kokusai Laser/Application '91, Seminar L-5, p 36–51), for example, there have been attempts to improve the precision with which the amount of exposure is controlled by means of what is known as multiple-pulse exposure wherein exposure is carried out by continuously oscillating a plurality of pulses. This is to say, this technique attempts to reduce variation in the total amount of exposure by increasing the number of exposure pulses.

Now, in a stepper, exposure and mount movement are repeated alternately. Therefore, the mode of operation of the excimer laser constituting the light source is inevitably a burst mode involving the repetition of an operation in which laser light is continuously oscillated in pulses a predetermined number of times, and then the pulse oscillation is stopped for a predetermined time. In other words, the burst mode involves the alternate repetition of a continuous pulse oscillation time and an oscillation-stopping time.

It should be noted that when "continuous pulse" and "continuous pulse oscillation" are referred to in this specification, they are used with the meaning that pulse discharge is repeatedly carried out and successive pulse laser light can be repeated; and they are used with a different meaning from "continuous oscillation laser" and "CW oscillation" as referred to more generally.

Now, as mentioned above, because excimer lasers are pulse discharge excitation gas lasers, it is difficult to always sustain the oscillation at pulse energy of a constant magnitude. Reasons for this include that the discharge produces density disturbances in the laser gas within the discharge space and causes the subsequent discharge to become non-uniform and unstable, and that such non-uniform discharges and the like produce local temperature increases at the surfaces of the discharge electrodes, and cause degradation of the subsequent discharge and cause the discharge to become non-uniform and unstable.

In particular, this tendency is marked at the start of the abovementioned continuous pulse oscillation period, and a phenomenon known as spiking occurs whereby, as shown by the portion S in FIG. 8($a$), relatively high pulse energy is obtained in the initial pulses following the passage of an oscillation-stopping period, but then the discharge degrades and the pulse energy gradually reduces. This is to say, as shown in FIG. 8, even if laser oscillation is undertaken at a predetermined constant discharge voltage corresponding to a constant pulse energy Ps in order to obtain this level of energy, in practice a number of pulses of pulse energy will initially be larger than Ps.

Thus, excimer laser devices operating in burst mode have problems in that the abovementioned variation in the energy of each pulse reduces the precision with which the amount of exposure is controlled, and the phenomenon of spiking also markedly increase such variation and greatly reduces the precision with which the amount of exposure is controlled.

In recent years, moreover, the sensitivity of light-sensitive agents coated onto wafers has increased, which is contributing to increases in throughput, and therefore exposure using fewer continuous pulses has become possible and there is a tendency toward a reduced number of pulses.

However, with fewer pulses, there is a commensurate increase in the variation in the total pulse energy of the plurality of pulses, and it is more difficult to maintain the precision with which the amount of exposure is controlled using only the multiple-pulse exposure control discussed above.

In addition, in recent years, exposure methods in exposure devices for semiconductors have been moving from the stepper method in which a mount is immobilized and exposure carried out, to step & scan methods in which exposure is carried out while moving the mount. In such step & scan methods, because the exposure is carried out while moving the mount, it is not possible to use the conventional technique whereby variations in the total amount of exposure are reduced by increasing the number of exposure pulses as discussed above, and other techniques have to be used to ensure control such that the pulse energy of each pulse is uniform.

The present Applicants have applied for various patents (Japanese Patent Application No. 4-191056, Japanese Patent Application Laid-Open No. 7-106678 (Japanese Patent Application No. 5-249483) etc.) for inventions relating to what can be termed spiking-prevention control in which the initial energy rise caused by the phenomenon of spiking is prevented by varying the discharge voltage with each pulse in such a way that the discharge voltage of the initial pulse of a continuous pulse oscillation in burst mode is reduced, and the discharge voltages of the pulses are gradually increased thereafter, by making use of the property whereby the energy of the pulse oscillated increases as the discharge voltage (charge voltage) increases.

These techniques of the prior art are arranged so as to control the discharge voltage in a variable fashion in accordance with the oscillation-stopping time Tpp of the burst mode operation (see FIG. 8($a$)), the charge voltage value and the like, it having been noticed that the magnitude of the spiking depends greatly on the oscillation-stopping time Tpp, the charge voltage value and the like.

However, in the prior art, on the side of the excimer laser for the stepper, laser oscillation control has been carried out using the laser oscillation synchronization signal TR, sent from the stepper side, as oscillation triggers. This is to say, as shown in FIG. 8($b$), the laser side is arranged so as to receive the laser oscillation synchronization signal TR for carrying out continuous pulse oscillation sent from the stepper side, and to carry out continuous pulse oscillation synchronously with the laser oscillation synchronization signal TR which are received; only passive control being carried out on the laser side.

Therefore, on the laser side, it is not possible to know in advance what sort of burst operation mode the stepper side desires the laser oscillation to be in. This is to say, information such as the cycle of the continuous pulse oscillation, the number of continuous pulse oscillations, whether the oscillation-stopping mode is currently in effect or not, and the oscillation-stopping time is all unknown information, but the laser side has to be arranged so as to be always able to effect the correct discharge voltage control without prior warning whenever a laser oscillation synchronization signal is input.

Therefore, in the Japanese Patent Application Laid-open No. 7-106678 (Japanese Patent Application No. 5-249483), for example, the following control is carried out to enable the correct discharge voltage control to be effected whenever a laser oscillation synchronization signal TR is received.

In this technique of the prior art, charge voltage data, for matching the energy of each pulse of the continuous pulse oscillation with a predetermined target value Ps, is prestored in memory, for each pulse of the continuous pulse oscillation (what number pulse it is), using the oscillation-stopping time, the charge voltage value and the like as parameters. Further, whenever continuous pulse oscillation is carried out, the pulse energy of each pulse at that time is stored in memory, and the stored items of data are used for charge voltage control of each pulse during the subsequent continuous pulse oscillation. This is to say, each of the preceding pulse energy values which have been stored in memory is compared with the target value Ps, the abovementioned charge voltage data of each pulse, which has been stored in memory, is corrected in accordance with the results of the comparison, and charge voltage control is performed in accordance with the corrected charge voltage data.

Further, such charge voltage control is arranged such that preliminary control such as that outlined below is carried out since, as discussed above, the input timing of the laser oscillation synchronization signal TR cannot be known on the laser side. To elaborate, the laser side incorporates a timer which carries out a timing action by counting a system clock signal of a cycle shorter than the cycle of the laser oscillation synchronization signal TR, and is arranged so as to make a judgment as to whether the current system clock input instant is during the continuous oscillation or during the oscillation-stopping time, by comparing the timing output of this timer with a predetermined set time, and is arranged in such a way that, using the result of this judgment, it computes the optimum charge voltage value for each system clock input instant by carrying out the correction computation for the charge voltage discussed above at this instant, and controls the charge capacitor so as to achieve the computed charge voltage at each system clock input instant. For example, when it is judged that the current instant is during the oscillation-stopping time, the assumption is made that the interval from when a laser oscillation synchronization signal TR was last input until the current instant is the oscillation-stopping time Tpp, the charge voltage data corresponding to this assumed oscillation-stopping time Tpp is read out, a computation is carried out whereby the charge voltage data is corrected using the results of a comparison between the target value Ps for the pulse energy value and the monitor value of the first burst of energy of the preceding continuous pulse oscillation, and the charge capacitor is controlled so as to achieve the computed charge voltage.

Thus, in this technique of the prior art, the power source circuit for the discharge is always in standby m de always so as to always obtain the optimum charge value for that moment, regardless of the fact that it may be during the oscillation-stopping time, in such a way that a laser oscillation synchronization signal TR may be input at any time.

Thus, this technique of the prior art has problems in that, for example:

(a) Because the power source circuit is controlled and a high voltage is supplied, even during laser oscillation stopping operation, it is dangerous and a substantial amount of electrical energy is consumed.

(b) Because the time calculation of the stopping time is carried out based on a system clock signal within the laser device, and not on the timing of when the laser oscillation synchronization signal TR is actually input, the stopping time is not accurately calculated, and the controllability of the spiking control is impaired.

(c) Because the computation for the charge voltage control is constantly carried out, there is an adverse effect on the responsiveness and control speed of various other control tasks.

Now, in laser exposure devices of this type, various control tasks are carried out including, on the laser device side, charge voltage control as discussed above in which the target pulse energy Ps is received from the exposure device, in such a way as to achieve the received target pulse energy Ps. At this time, on the laser device side, charge voltage control is carried out by monitoring the energy of each laser pulse actually output, and comparing the target pulse energy Ps and the monitored value, as discussed above.

However, the monitored value on the laser device side is no more than the monitored value of the energy on the laser device side, and this does not necessarily coincide with the laser energy value in the stage when the exposure is actually performed. This is to say, it sometimes happens that the monitored value of the energy on the laser device side fails to coincide with the laser energy value in the stage when the exposure is actually performed for reasons such as drift of the energy monitor of the laser device, and changes in the transmittance in the exposure device caused by mode changes in the laser beam (for example, for reasons such as part of the laser beam being kicked by a slit or the like provided in the laser-incidence aperture of the exposure device caused by widening of the laser beam).

Thus, in the prior art, the monitored value differs from the laser energy value in the stage when the exposure is actually performed, and accurate exposure control cannot therefore be carried out, since the output of a monitor placed on the laser device side is used for the monitored energy value of the laser pulse.

This invention has taken this situation into account and aims to provide a laser processing device which provides for stability in the laser device without requiring charge control during laser oscillation stopping operation, and which is able to perform high-precision laser output constancy control, and is able to improve the responsiveness and control speed of various other control tasks.

This invention further aims to provide a laser processing device which is able to perform accurate exposure control by correcting for variations in the transmittance of the laser output, and variations in the laser output monitor.

DISCLOSURE OF THE INVENTION

This invention provides a laser processing device comprising: a laser device for carrying out a burst mode operation involving alternate repetition of a continuous oscillation operation wherein laser light is continuously subjected to pulse oscillation in a predetermined cycle for a predetermined number of times and a stopping operation wherein the continuous pulse oscillation is stopped for a predetermined time after the continuous oscillation operation; and a processing device for performing a predetermined type of work by means of the laser light produced by the laser device, characterized in that: the processing device comprises burst-on/off signal transmitting means which produces a burst-on signal for starting the continuous oscillation operation and a burst-off signal for stopping the continuous oscillation operation and starting the stopping operation, and transmits the burst-on and -off signals to the laser device; and the laser device comprises control means which receives the burst-on signal and the burst-off signal and performs control relating to the burst operation using these signals.

In this invention, pulse oscillation in the abovementioned laser device may be carried out synchronously with a laser oscillation synchronization signal transmitted from the processing device to the laser device, or may be carried out synchronously with a laser oscillation synchronization signal produced by the laser device itself.

According to such an invention, the laser device performs control relating to the burst operation using a burst-on signal and burst-off signal sent from the processing device side.

Consequently, when the arrangement is such that the laser oscillation synchronization signal is produced by the processing device, if the arrangement is such that, on the processing device side, a laser oscillation synchronization signal acting as a trigger signal for continuous pulse oscillation is transmitted after a burst-on signal, and a burst-off signal is transmitted after the laser oscillation synchronization signal, then, on the laser device side, its is sufficient to carry out charge voltage control for spiking-prevention control from the instant when the burst-on signal is input until the instant when the first laser oscillation synchronization signal is input, and there is no need to carry out charge voltage control during the time when the laser oscillation is stopped.

Further, when the arrangement is such that the laser oscillation synchronization signal is produced by the laser device itself, if the arrangement is such that the laser oscillation synchronization signal is produced after receipt of the burst-on signal, and a burst-off signal is transmitted after the laser oscillation synchronization signal, then, on the laser device side, it is sufficient to carry out charge voltage control for spiking-prevention control from the instant when the burst-on signal is input until the instant when the first laser oscillation synchronization signal is input, and there is no need to carry out charge voltage control during the time when the laser oscillation is stopped.

Further, this invention provides a laser processing device comprising: a laser device which carries out a burst mode operation involving alternate repetition of a continuous oscillation operation wherein laser light is continuously subjected to pulse oscillation for a predetermined number of times and a stopping operation wherein the continuous pulse oscillation is stopped for a predetermined time after the continuous oscillation operation; and a processing device which performs a predetermined type of work by means of the laser light produced by the laser device, characterized in that:

the laser device comprises first monitor means which monitors an energy of the pulse-oscillated laser light, and first energy computation means which determines a cumulative energy or an average energy of output laser light during the continuous oscillation operation based on output of the first monitor means, and transmits the cumulative energy value or average energy to the processing device;

the processing device comprises second monitor means which monitors an energy of the laser light input to the processing device, second energy computation means which determines a cumulative energy or average energy of input laser light based on output of the second monitor means, and target energy correction means which corrects a target energy value of the continuous pulse oscillation, which has been set in advance, by means of an energy value transmitted from the first energy computation means and an energy value computed by the second energy computation means, and transmits the corrected target energy value to the laser device; and the laser device further comprises control means which carries out laser output control using the received corrected target energy value as a target value.

According to such an invention, the target energy value of the continuous pulse oscillation, which has been set in advance, is corrected using the result of a comparison of the laser monitor output on the processing device side and the laser monitor output on the laser device side, and exposure constancy control is performed using this corrected target energy value as the target value.

Consequently, variations in the transmittance of the laser output, and variations in the laser output monitor are canceled, and accurate exposure constancy control can be achieved.

BRIEF DESCRIPTION OF THE DRAWINGS

FIGS. 8a) and 8(b) are figures showing the phenomenon of spiking in burst mode operation, and the laser oscillation synchronization signal.

BEST MODE FOR CARRYING OUT THE INVENTION

Embodiments of this invention are described in detail below with reference to the appended figures.

Figure 1:
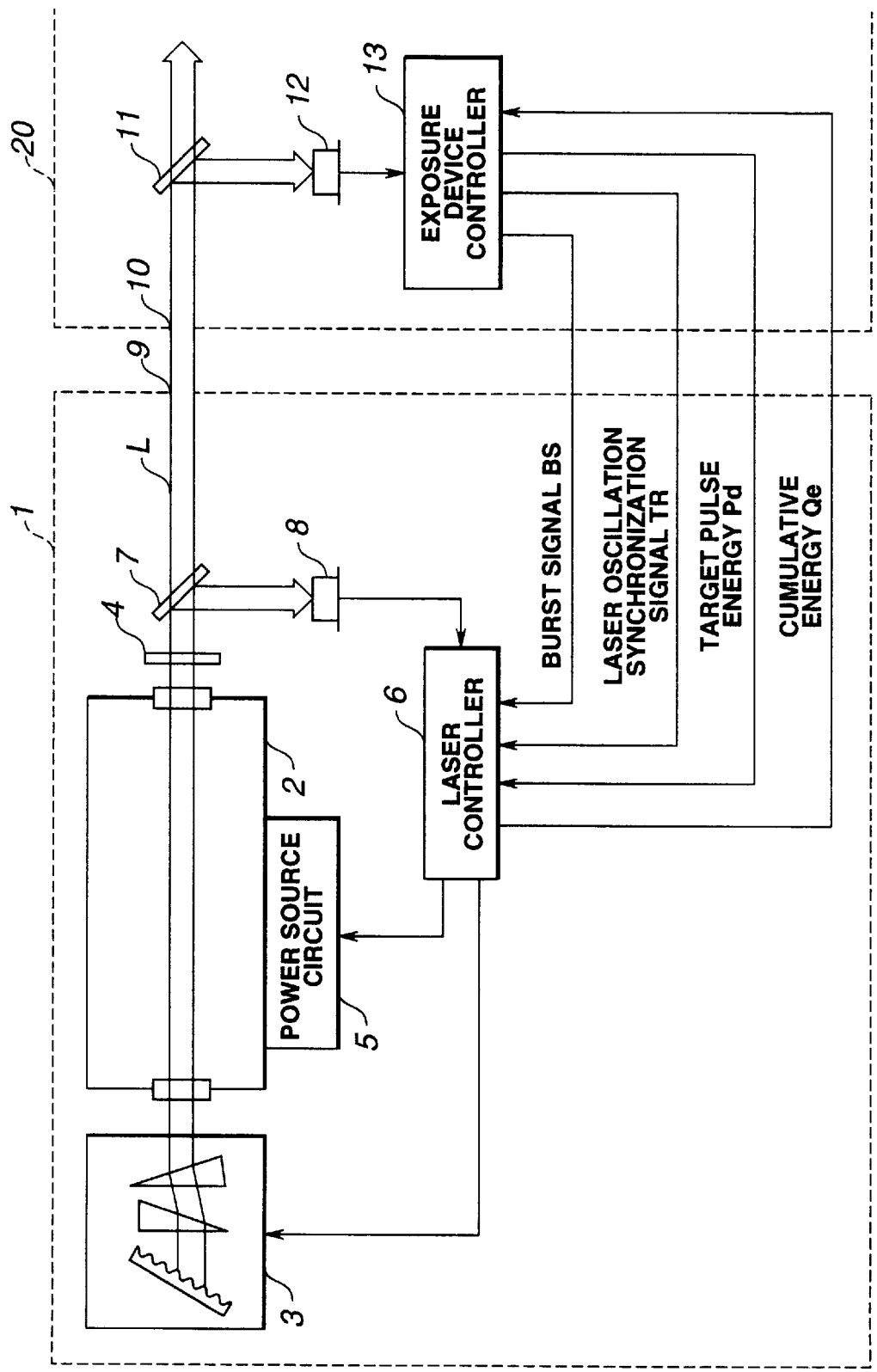
FIG. 1 is a block diagram showing a first embodiment of this invention.

FIG. 1 shows a first embodiment of a case in which a bandwidth-narrowing excimer laser 1 is used as a laser device, and a stepper 20 which carries out reduction projection exposure processing of the circuit pattern of a semiconductor is used as a processing device.

The laser chamber 2 of the excimer laser 1 has discharge electrodes and the like which are not depicted, and laser oscillation is carried out by using a discharge between the discharge electrodes to stimulate a laser gas comprising Kr, F2, Ne or the like filling the inside of the laser chamber 2. The light which is produced is returned back to the laser chamber 2 where it is amplified, is converted to a narrow bandwidth by a bandwidth-narrowing unit 3, and is output as oscillation laser light L via a front mirror 4. In addition, some of the light returns back from the front mirror 4 to the laser chamber 2, where laser oscillation occurs. It should be noted that the laser light L is output successively by means of a burst mode operation involving alternate repetition of a continuous oscillation operation involving oscillation of pulses continuously in a predetermined cycle and for a predetermined number of times, and a stopping operation in which the abovementioned continuous pulse oscillation is stopped for a predetermined time after the continuous oscillation operation.

The laser power source circuit 5 carries out the discharge by applying a potential difference V across the abovementioned discharge electrodes in accordance with voltage data supplied from a laser controller 6. It should be noted that, in the laser power source circuit 5, the discharge is carried out by the action of a switch element, such as a thyratron or the like, once the discharge voltage has been charged by a charge circuit which is not depicted.

Part of the laser light L which is oscillated from the resonator comprising the front mirror 4, laser chamber 2 and bandwidth-narrowing unit 3 is sampled by a beam splitter 7 and falls incident upon a monitor module 8. The remainder of the laser light L is sent via a slit 9 to an exposure device 20.

In the monitor module 8, the energy E of each pulse of the output laser light L is detected. The detected energy value E is input to the laser controller 6. Further, items of data such as the spectral line width and wavelength of the laser light L are detected by means of a spectroscope and line sensor, which have been omitted from the depiction, and these items of data are also input into the laser controller 6.

Figure 2:
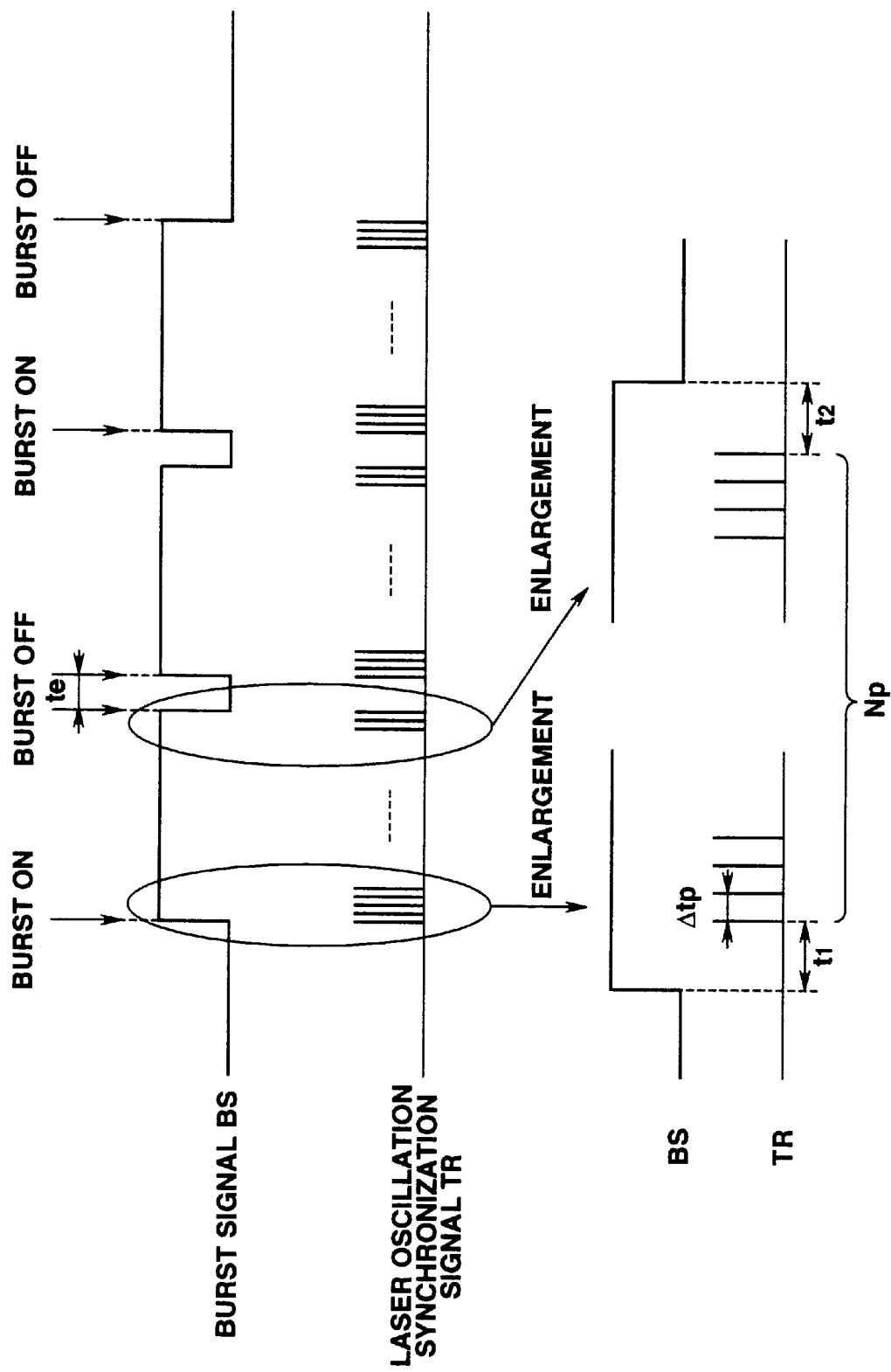
FIG. 2 is a time chart for the burst signal and laser oscillation synchronization signal in the first and a second embodiment.

The following signals are input into the laser controller 6 from the exposure device 20:

Burst signal BS (see FIG. 2)

Laser oscillation synchronization signal TR (see FIG. 2)

Target pulse energy value Pd

By way of control operations associated with the present invention based on these input signals, the following control operations are mainly performed in the laser controller 6.

(1) The pulse energies Pi (i=1 to n) detected by the monitor module 8 during continuous pulse oscillation are stored in memory. The stored data is used to calculate the charge voltages for the subsequent continuous pulse oscillation.

(2) The optimum charge voltage values for obtaining constant pulse energy are stored in advance as a voltage data table, for each oscillation sequence number i, using the target pulse energy Pd and oscillation-stopping time Tpp as parameters, and the optimum charge voltage values Vi corresponding to the current target pulse energy Pd and oscillation-stopping time Tpp are read out, from this stored data, for each oscillation sequence number i, for each burst cycle. Also, the abovementioned monitored values of the pulse energies Pi of the continuous pulse oscillation of the preceding cycle, which have been stored in memory, are compared with the current target pulse energy value Ps, the abovementioned optimum charge voltage values Vi which were read out are corrected in accordance with the results of this comparison, and the corrected charge voltage values Vi' are output to the power source circuit 5 where charge control is carried out.

(3) The pulse energies Pi detected by the monitor module 8 are subjected to interim progressive integration during the period of a single burst, thereby calculating the cumulative energy Qe during the period of a single burst, and this cumulative energy value Qe is transmitted to the exposure device 20.

(4) What number pulse oscillation the current pulse oscillation is in the sequence is confirmed by counting the laser oscillation synchronization signal TR.

The exposure device 20 is provided with a beam splitter 11 which samples some of the laser light L which falls incident upon it via a slit 10, and the sampled light falls incident upon a monitor module 12. The energy Pi' of each pulse of the incident laser light L is detected by the monitor module 12, and the detected energy values Pi' are input to an exposure device controller 13. It should be noted that the laser light which passes through the beam splitter 11 is used in the reduction exposure process.

In the exposure device controller 13, the following processes associated with the present invention are performed in addition to controlling the movement of a mount on which a wafer is mounted and the reduction exposure process.

(1) The pulse energies Pi' detected by the monitor module 12 are subjected to interim progressive integration during the period of a single burst, thereby calculating the cumulative energy Q1 during the period of a single burst. Then the set target pulse energy Ps (the target energy in a single pulse oscillation) is corrected by comparing this calculated value Q1 with the cumulative energy value Qe sent from the laser device 1. The correction computational equation is shown by the following equation.

$$Pd=(Qe/Q1) \cdot Ps$$

Then, the corrected target pulse energy Pd resulting from this correction is sent to the laser device 1.

Because of this correction of the target pulse energy, variations in the transmittance of the laser light from the time it emerges from the laser device until the exposure, and variations caused by drift of the monitor module 8 in the laser device, are absorbed.

(2) A burst signal BS is transmitted together with the laser oscillation synchronization signal TR to the laser device 1. A time chart for the laser oscillation synchronization signal TR and the burst signal BS is shown in FIG. 2. The laser oscillation synchronization signal TR function as a trigger signal for a continuous pulse oscillation in the laser device 1, as described earlier in FIG. 8 as well. The burst signal BS functions so as to start the continuous oscillation operation in the laser device 1 (burst-on) as it rises, and to stop the continuous oscillation operation in the laser device 1 (burst-off) as it falls, and it is set in such a way that the first laser oscillation synchronization signal TR is produced a predetermined time ti after the burst-on instant, and burst-off is achieved a predetermined time t2 after the production of the last laser oscillation synchronization signal TR. It should be noted that the corrected target pulse energy Pd discussed above is sent to the laser device 1 in the burst-stopping period between the turning off and turning on of the burst signal BS.

Figure 3:
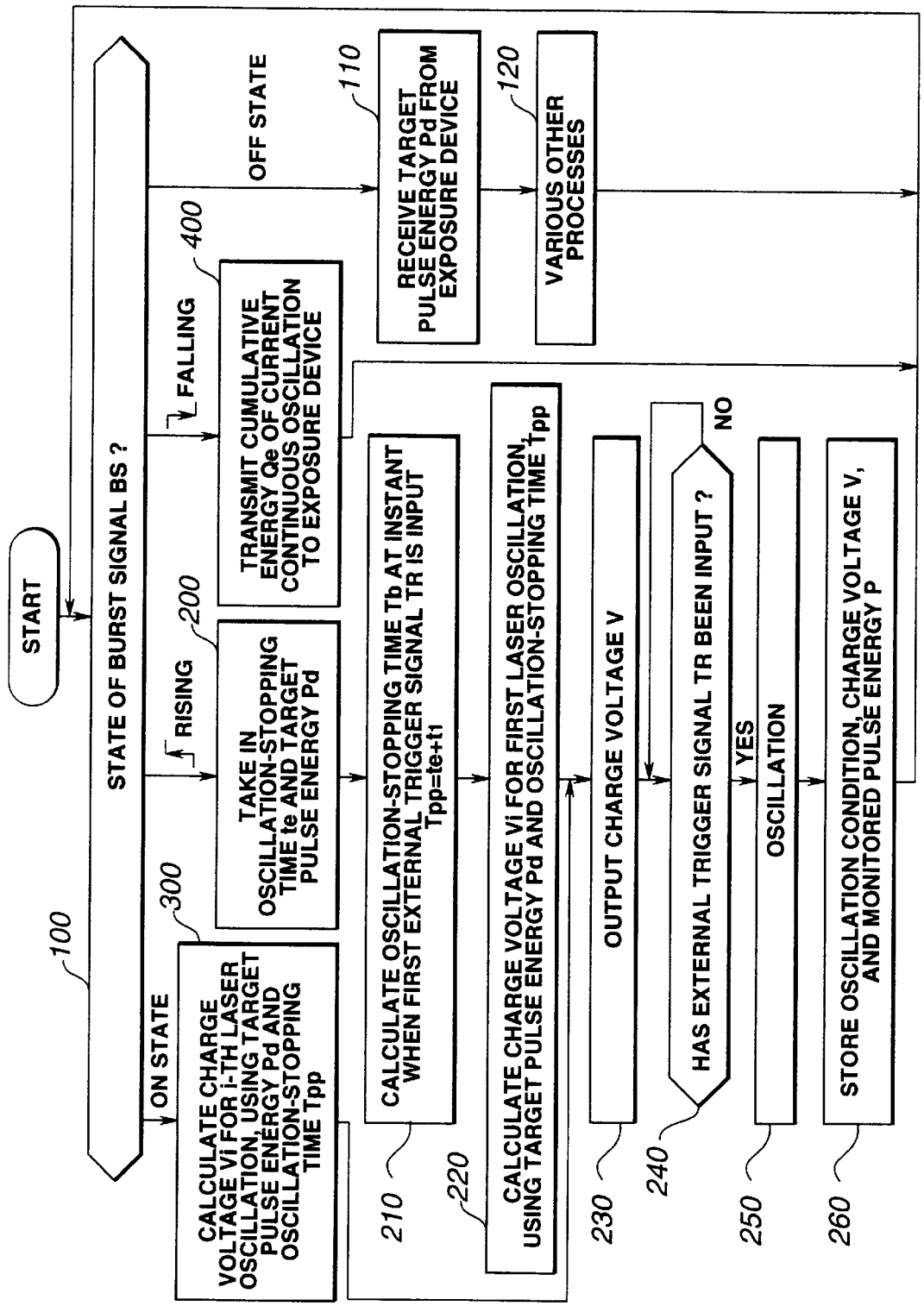
FIG. 3 is a flow chart showing an example of the action of charge voltage control based on the burst signal in a laser controller for the first embodiment.

The charge voltage control in the excimer laser 1 is now described with reference to the flow chart in FIG. 3.

In the laser controller 6, the mode of the burst signal BS is always assessed, and various different processing tasks are performed in accordance with the results of the assessment (Step 100).

Firstly, in the laser controller 6, the corrected target pulse energy Pd is sent from the exposure device 20 during the burst-stopping period when the burst signal BS is in the off mode, and therefore this target pulse energy Pd is received and stored in memory (Step 110). Further, the laser controller 6 performs other processes (Step 120) apart from the charge voltage control during this burst-stopping period.

Then, when a rise in the burst signal BS is detected, the laser controller 6 performs a process as outlined below during the period (time t1 in FIG. 2) from the instant of this rise until the first laser oscillation synchronization signal TR is input.

Firstly, the laser controller 6 incorporates a timer which times the oscillation-stopping time te (see FIG. 2) from the instant when the burst signal BS turns off until it turns on, and, when the burst signal BS rises to on, the laser controller 6 takes in the output te of this timer, and takes in the corrected target pulse energy Pd sent from the exposure device 20 during the immediately preceding burst-stopping time (Step 200).

Next, the laser controller 6 computes (Step 210) the true oscillation-stopping time Tpp at the instant when the first laser oscillation synchronization signal TR is input, in accordance with the following equation.

$$Tpp = te + t1 \quad \ldots (1)$$
or
$$Tpp = te + t1 + t2 \quad \ldots (2)$$
t1; fixed value (see FIG. 2)
t2; fixed value (see Fig. 2)

It should be noted that, of the above two equations, Equation (2) is more accurate since the true oscillation-stopping time Tpp is the period from when the last laser oscillation synchronization signal TR of the former burst cycle is produced until the initial laser oscillation synchronization signal of the current burst cycle, TR is produced.

Next, the laser controller 6 calculates (Step 220) the charge voltage V1 for the current first laser oscillation using the abovementioned target pulse energy Pd which was taken in, and the oscillation-stopping time Tpp.

This is to say, in the laser controller 6, the optimum charge voltage values for obtaining a constant pulse energy are stored in memory in advance as a voltage data table, for each oscillation sequence number i, using various values of the target pulse energy Pd and the oscillation-stopping time Tpp as parameters.

Figure 4A:
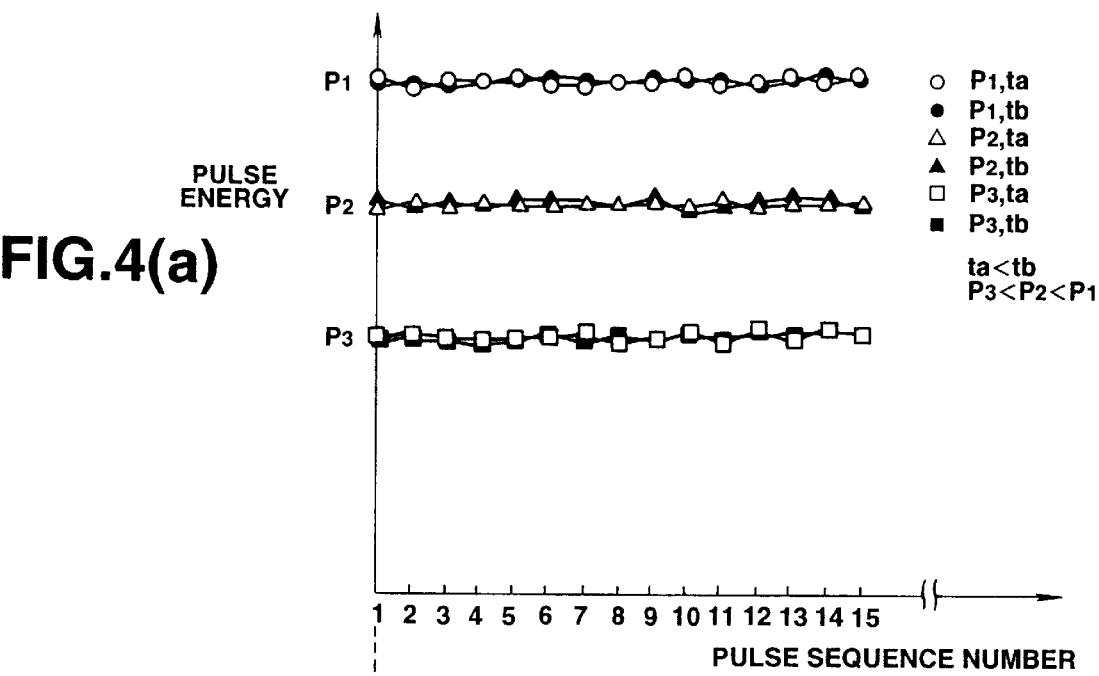
FIGS. 4(a) and 4(b) are figures showing the relationship between the oscillation-stopping time and target pulse energy and the charge voltage.
Figure 4B:
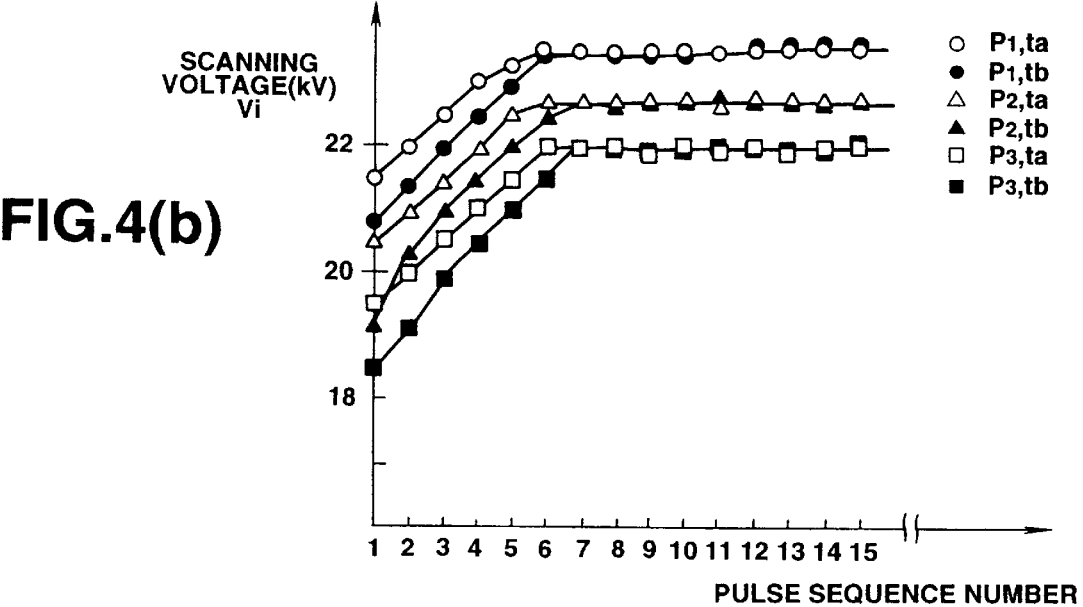

By way of example, FIG. 4 shows the results of tests under a total of six different conditions when, in the initial burst oscillation period, the target pulse energy Pd was varied between three different values P1, P2 and P3 (P1<P2<P3), and the oscillation-stopping time Tpp was varied between two different values ta and tb (ta<tb): FIG. 4(*a*) showing the pulse energy monitored values for each oscillation sequence number i, and FIG. 4(*b*) showing the charge voltage values Vi for each oscillation sequence number i.

It will be appreciated that, in all these cases, if the arrangement is such that a charge voltage as shown in FIG. 4 (*b*) is applied, then, as shown in FIG. 4(*a*), the phenomenon of spiking is absorbed and the various pulse energies can be made to more or less coincide with the target values (P1, P2 and P3). Further, as will be appreciated from FIG. 4(*b*), the charge voltage value Vi is increased until the seventh pulse in this instance in order to eradicate the phenomenon of spiking, and the charge voltage values are a more or less constant value from the seventh pulse onward. Further, it will also be appreciated that, because the phenomenon of spiking becomes more marked if the oscillation-stopping time Tpp is long, the initial pulse charge voltage must be made lower if the oscillation-stopping time Tpp is long. Again, it will also be appreciated that the greater the target pulse energy Pd is, the greater the charge voltage will have to be.

In the voltage data table in the laser controller 6 discussed above, charge voltage data as shown in FIG. 4, for constancy control of the pulse energies during continuous pulse operation to a predetermined target value, is stored in advance in memory, for each oscillation sequence number i, using the target pulse energy Pd and oscillation-stopping time Tpp as parameters.

Further, as discussed above, the various pulse energy monitored values are input from the monitor module 8 to the laser controller 6, and these monitored values are given a correspondence with the oscillation sequence numbers i and stored in memory by the laser controller 6.

When the charge voltage of the first pulse is calculated, the laser controller 6 first reads out, from the abovementioned voltage data table, the charge voltage value corresponding to the first pulse and corresponding to the target pulse energy Pd and oscillation-stopping time Tpp taken in in the processing of Step 200. Then, the abovementioned monitored value of the energy of the first pulse of the preceding continuous pulse oscillation, which was stored in memory, is compared with the target pulse energy value Pd input from the abovementioned exposure device 20, the charge voltage value read out from the abovementioned voltage data table is corrected in accordance with the result of this comparison, and the result of this correction is output (Step 230) to the power source circuit 5 as the current, which is to say the first pulse oscillation charge voltage value V1.

It should be noted that, by way of a technique for the abovementioned correction computation, there is, for example, a technique in which the difference between the monitored value of the energy of the preceding first pulse and the target pulse energy value Pd is determined, and correction is not carried out when this difference is less than a predetermined set value, while the charge voltage value is increased or decreased in accordance with the positive or negative attribute (±) of the abovementioned difference when the difference is more than a set value.

Following this, in the laser controller 6, at the instant when the first laser oscillation synchronization signal TR is received from the exposure device 20, an oscillation command is supplied to the power source circuit 5 (Steps 240 and 250). As a result, discharge control based on a previously supplied charge voltage is performed by the power source circuit 5.

Next, the laser controller 6 stores in memory the pulse energy P monitored by the monitor module 8, and the charge voltage value V1. This stored data is used in the calculation of the first charge voltage of the subsequent continuous pulse oscillation. It should be noted that oscillation conditions which are stored in memory include the target pulse energy Pd, oscillation-stopping time Tpp, and the pulse oscillation sequence numbers i.

The first pulse oscillation is carried out as outlined above.

Next, a computation which is basically the same as that for the first pulse oscillation is carried out (Step 300) during continuous pulse oscillation with the burst signal BS in the on mode.

This is to say, when calculating the charge voltage of the i-th (i=2 to n) pulse, the laser controller 6 reads out, from the abovementioned voltage data table, the charge voltage value corresponding to the i-th pulse and corresponding to the target pulse energy Pd and oscillation-stopping time Tpp taken in in the previous processing of Step 200. Then, the abovementioned monitored value of the energy of the i-th pulse of the preceding continuous pulse oscillation, which was stored in memory, is compared with the target pulse energy value Pd input from the abovementioned exposure device 20, and the charge voltage value read out from the abovementioned voltage data table is corrected (Step 300) in accordance with the result of this comparison. Then, the result of this correction is output (Step 230) to the power source circuit 5 as the current, which is to say the i-th pulse oscillation charge voltage value Vi.

Following this, in the laser controller 6, at the instant when the i-th laser oscillation synchronization signal TR is received from the exposure device 20, an oscillation command is supplied to the power source circuit 5 (Steps 240 and 250). As a result, discharge control based on a previously supplied charge voltage is performed by the power source circuit 5.

Following this, as described above, the laser controller 6 stores in memory various oscillation conditions from the current pulse oscillation, the pulse energy P monitored by the monitor module 8, and the charge voltage value Vi. This stored data is used in the calculation of the i-th charge voltage of the subsequent continuous pulse oscillation.

The i-th pulse oscillation is carried out as outlined above.

Next, when a fall in the burst signal BS is detected, the laser controller 6 calculates the cumulative energy Qe during a single burst period by integrating the pulse energy Pi monitored by the monitor module 8 during the current burst operation, and transmits (Step 400) the cumulative energy value Qe to the exposure device 20. This cumulative energy value Qe is used in the correction computation of the target pulse energy Ps in the exposure device 20, as discussed above.

Figure 5:
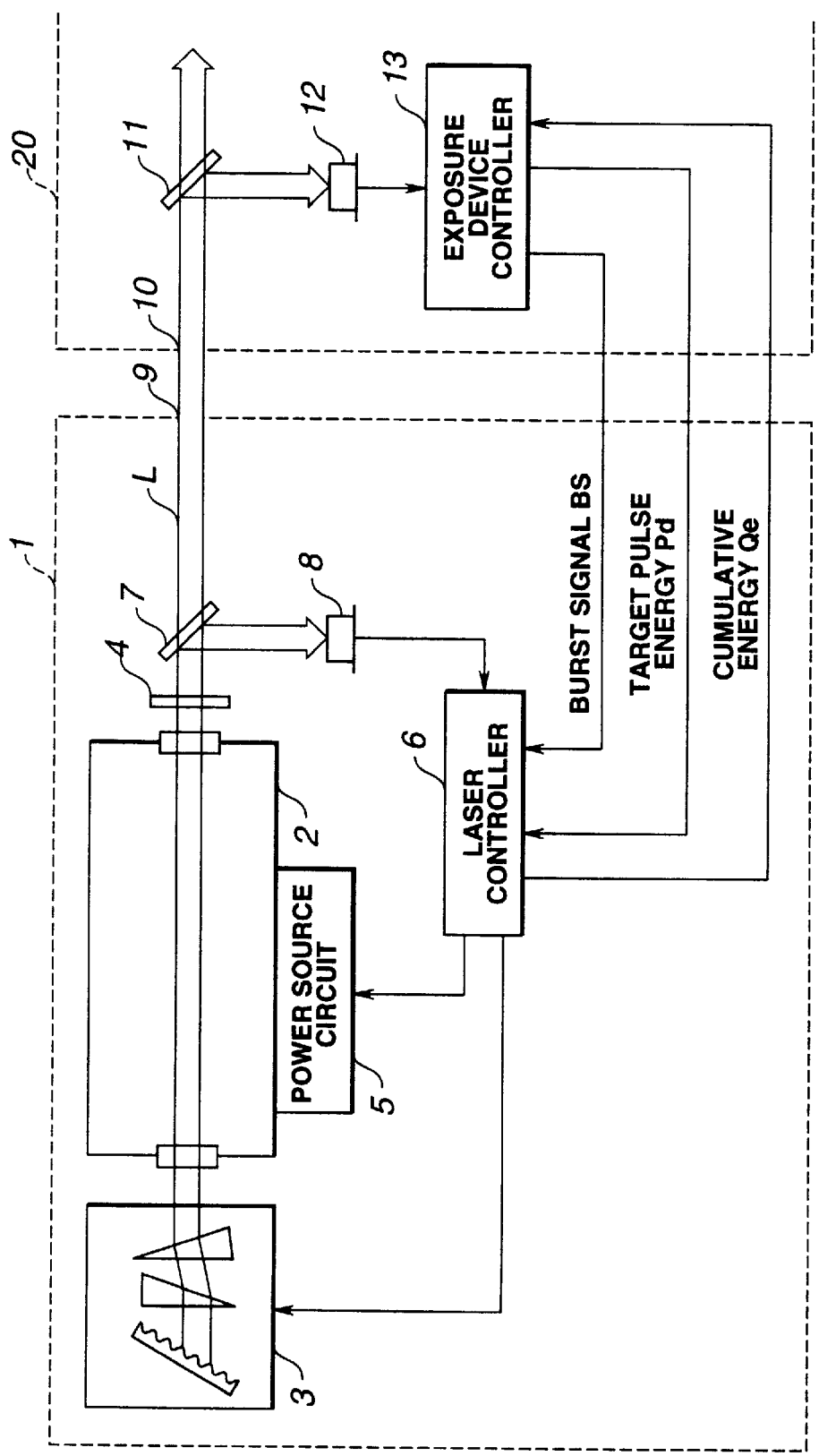
FIG. 5 is a block diagram showing a second embodiment of this invention.
Figure 6:
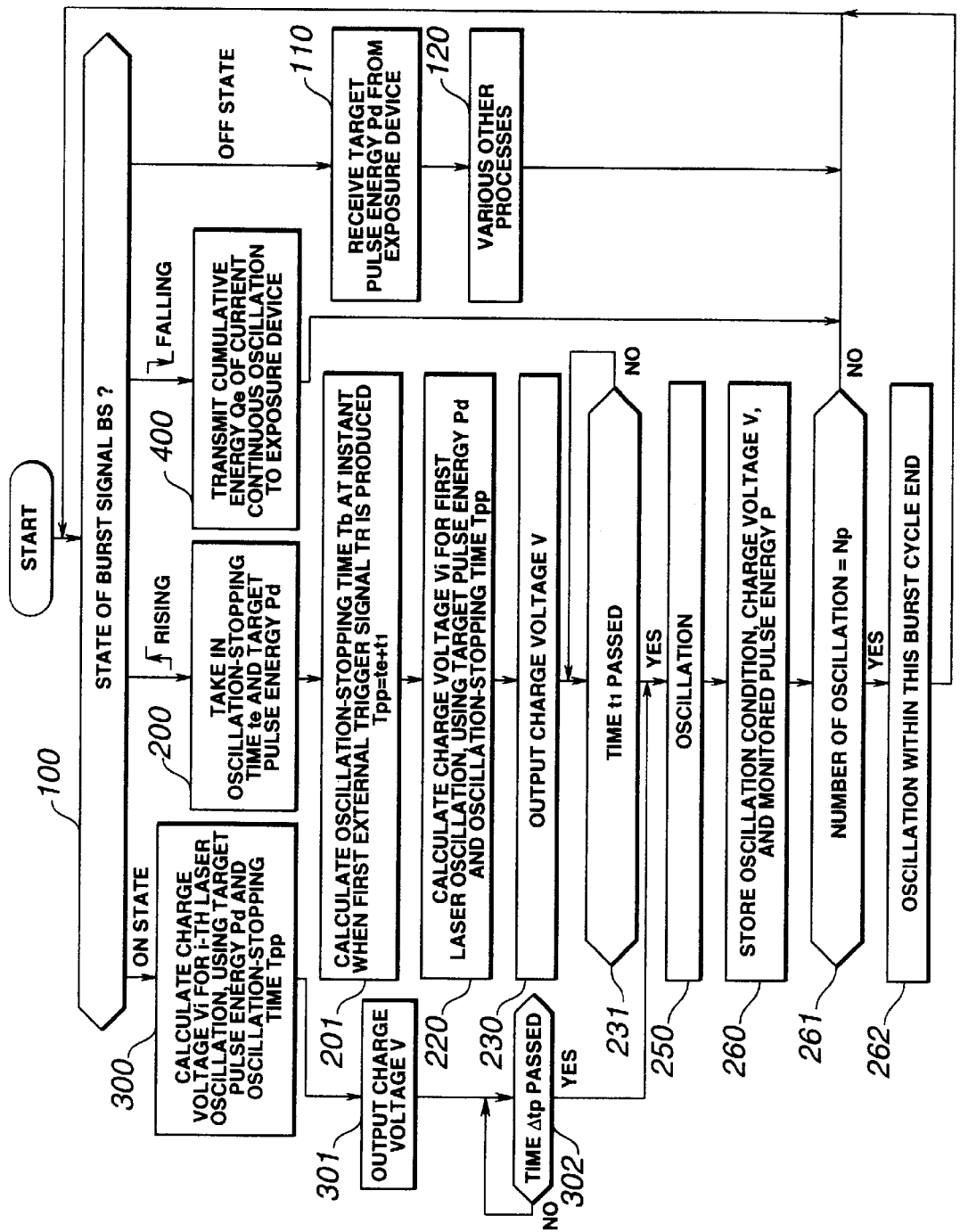
FIG. 6 is a flow chart showing an example of the action of charge voltage control based on the burst signal in a laser controller for the second embodiment.

A second embodiment of this invention is now described using FIG. 5 and FIG. 6.

In the first embodiment above, the arrangement was such that the stepper 20 produced both the burst signal BS and the laser oscillation synchronization signal TR, and output this to the excimer laser 1, but in this second embodiment the arrangement is such that the laser oscillation synchronization signal TR is produced on the excimer laser 1 side, and laser pulse oscillation synchronized with the laser oscillation synchronization signal TR is carried out by outputting, to the power source circuit 5, this laser oscillation synchronization signal TR produced by itself. As far as the burst signal BS is concerned, a signal such as is shown in FIG. 2 above is sent from the stepper 20 side to the excimer laser 1, as in the first embodiment above.

Consequently, in this second embodiment, there is advance knowledge on the excimer laser 1 side of the number Np of laser oscillation synchronization signal TR to be produced within a single burst cycle, and the production cycle Δtp thereof (see FIG. 2).

Therefore, in the configurational drawing of the second embodiment shown in FIG. 5, the signal pathway of the laser oscillation synchronization signal TR from the exposure device controller 13 to the laser controller 6 has been deleted from the configuration shown in FIG. 1 above.

More specifically, in contrast to the first embodiment above, in the exposure device controller 13 of FIG. 5, only the burst signal BS and target pulse energy Pd are output to the laser controller 6. Further, in the laser controller 6 of FIG. 5, when the burst signal BS input from the exposure device controller 13 rises, as shown in FIG. 2 above, the first laser oscillation synchronization signal TR is output after the passage of a time t1 from the instant of this rise, and Np laser oscillation synchronization signal TR are output with a predetermined cycle Δtp thereafter.

Charge voltage control by the excimer laser 1 in this second embodiment is now described following the flow chart in FIG. 6.

In the laser controller 6, the mode of the burst signal BS is assessed, and various different processing tasks are performed in accordance with the results of the assessment (Step 100), as was the case previously.

In the laser controller 6, the corrected target pulse energy Pd is sent from the exposure device 20 during the burst-stopping period when the burst signal BS is in the off mode, and therefore this target pulse energy Pd is received and stored in memory (Step 110). Further, the laser controller 6 performs other processes (Step 120) apart from the charge voltage control during this burst-stopping period. These processes are also as in the embodiment above.

Then, when a rise in the burst signal BS is detected, the laser controller 6 computes (Step 201) the true oscillation-stopping time Tpp in accordance with the above Equation (1) or Equation (2), as in the embodiment above, during the period (time t1 in FIG. 2) from the instant of this rise until the first laser oscillation synchronization signal TR is produced by itself, and calculates (Step 220) the charge voltage V1 for the current first laser oscillation, in the same way as above, using this computed oscillation-stopping time Tpp and the abovementioned target pulse energy Pd which has been taken in.

Following this, in the laser controller 6, upon the passage of the abovementioned time t1 from the instant when the burst signal BS rose, the first laser oscillation synchronization signal TR is produced, and this is supplied to the power source circuit 5. As a result, discharge control based on a previously supplied charge voltage is performed by the power source circuit 5 (Steps 231 and 250).

Next, the laser controller 6 stores in memory (Step 260) various oscillation conditions from the current pulse oscillation, the pulse energy P monitored by the monitor module 8, and the charge voltage value V1.

When the first pulse oscillation is carried out, as outlined above, the laser controller 6 counts the number of pulse oscillations in the burst cycle, and assesses whether the counted value coincides with Np or not. If it does coincide, the laser oscillation in the burst cycle is ended (Steps 261 and 262).

Next, a computation which is basically the same as that for the first pulse oscillation is carried out (Step 300) during continuous pulse oscillation with the burst signal BS in the on mode.

This is to say, when calculating the charge voltage of the i-th (i=2 to n) pulse, the laser controller 6 reads out, from the voltage data table, the charge voltage value corresponding to the i-th pulse and corresponding to the target pulse energy Pd and oscillation-stopping time Tpp taken in in the previous processing of Step 200. Then, the abovementioned monitored value of the energy of the i-th pulse of the preceding continuous pulse oscillation, which was stored in memory, is compared with the target pulse energy value Pd input from the abovementioned exposure device 20, and the charge voltage value read out from the abovementioned voltage data table is corrected (Step 300) in accordance with the result of this comparison. Then, the result of this correction is output (Step 301) to the power source circuit 5 as the current, which is to say the i-th pulse oscillation charge voltage value Vi.

In the laser controller 6, the time since the preceding laser oscillation synchronization signal TR was produced is timed and, if the elapsed time coincides with the cycle tp of the abovementioned pulse oscillation, a laser oscillation synchronization signal TR for the current pulse oscillation is produced and supplied to the power source circuit 5. As a result, discharge control based on a previously supplied charge voltage is performed by the power source circuit 5 (Steps 302 and 250).

Following this, as described above, the laser controller 6 stores in memory various oscillation conditions from the current pulse oscillation, the pulse energy P monitored by the monitor module 8, and the charge voltage value Vi.

Pulse oscillation containing Np laser pulses is performed as outlined above.

Next, when a fall in the burst signal BS is detected, the laser controller 6 calculates the cumulative energy Qe during a single burst period by integrating the pulse energy Pi monitored by the monitor module 8 during the current burst operation, and transmits (Step 400) the cumulative energy value Qe to the exposure device 20. This cumulative energy value Qe is used in the correction computation of the target pulse energy Ps in the exposure device 20, as discussed above.

A third embodiment of this invention is described below following FIG. 7.

Figure 7:
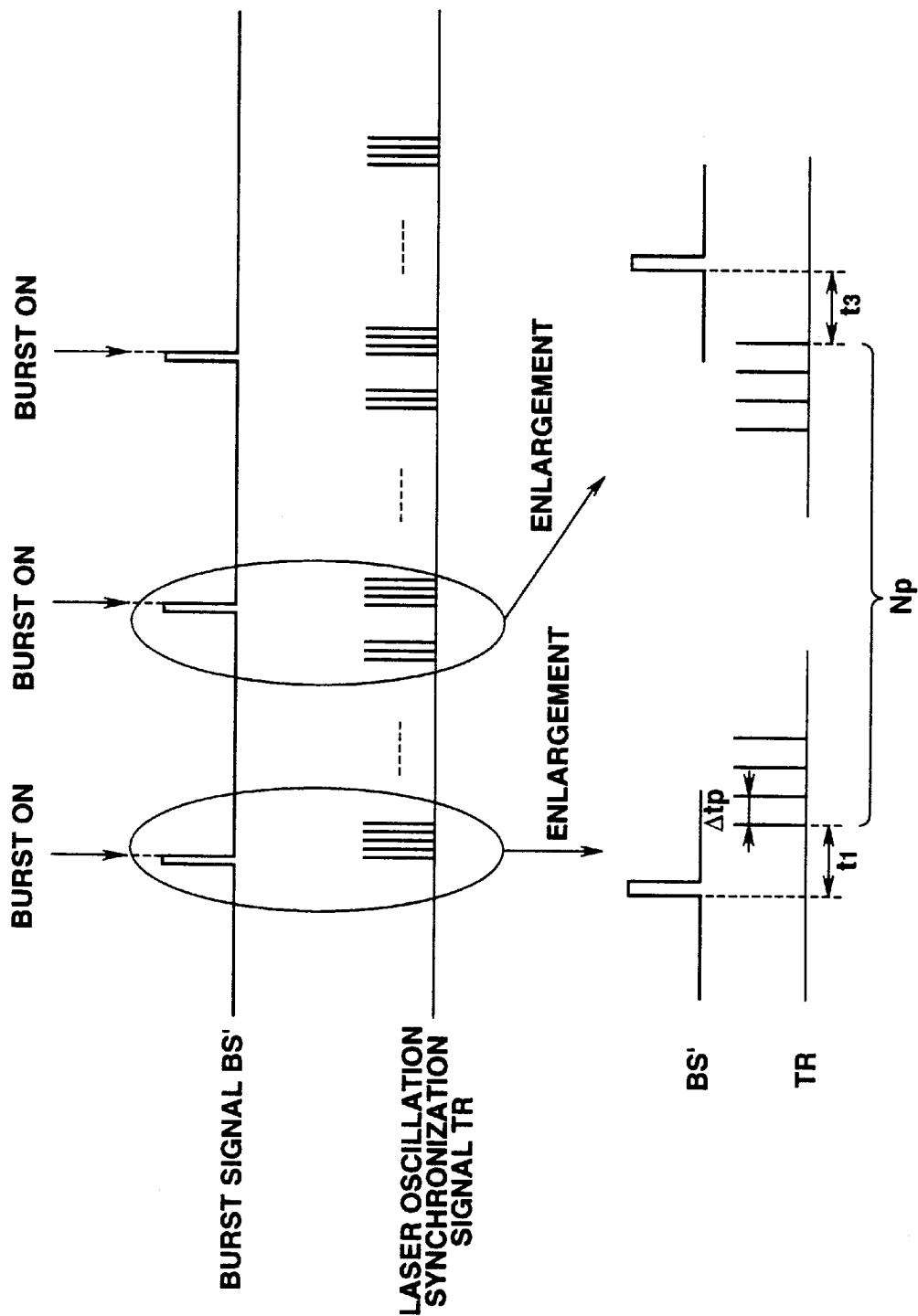
FIG. 7 is a time chart for the burst signal and laser oscillation synchronization signal in a third embodiment.

In the first and second embodiments above, the arrangement was such that the burst signal BS retains the on state during the period of the burst cycle, and burst-on is represented by its rise, and burst-off is represented by its fall, but, as shown in FIG. 7, in this third embodiment the exposure device controller 13 only outputs a one-shot burst-on signal BS', and a burst-off signal is not output.

As far as the laser oscillation synchronization signal TR are concerned, these may be produced by the exposure device controller 13 as in the first embodiment above, or may be produced by the laser controller 6 as in the second embodiment above.

However, in this third embodiment, if the laser oscillation synchronization signal TR are produced by the exposure device controller 13, at least the number Np of laser oscillation synchronization signal TR in one burst cycle must be known in advance on the laser controller 6 side, while if the laser oscillation synchronization signal TR is produced on the laser controller 6 side, at least the production cycle tp of the laser oscillation synchronization signal TR and the abovementioned number Np must be known in advance on the laser controller 6 side. Whatever the case, here the first laser oscillation synchronization signal TR is produced after the passage of a time t1 from the instant when the burst-on signal BS' is produced, and the burst-on signal BS' for the next burst cycle is produced after the passage of a time t3 from the instant when the last laser oscillation synchronization signal TR in a single burst cycle is produced.

Firstly, when the laser oscillation synchronization signal TR is produced by the exposure device controller 13, because the oscillation number Np in a single burst cycle is known on the laser controller 6 side, the laser controller 6 can count the laser oscillation synchronization signal TR sent from the exposure device controller 13 and so make a judgment that the instant when the count value coincides with Np is burst-off. Further, on the exposure device controller 13 side, an assessment can be made that the instant when a time t3 has passed from the instant when Np laser oscillation synchronization signal TR has been sent is the timing at which the next burst-on signal BS' is sent.

Then, in the same way as described above, when the laser oscillation synchronization signal TR is produced on the laser controller 6 side, because the oscillation number Np in the single burst cycle is known on the laser controller 6 side, the laser controller 6 can count the laser oscillation synchronization signal TR sent from the exposure device controller 13 and so make a judgment that the instant when the count value coincides with Np is burst-off.

Further, in this case, the arrangement is such that the signal-send timing of the burst-on signal BS' is known or confirmed on the exposure device controller 13 side either by transmitting a continuous pulse oscillation end signal (sent with the same timing as the last laser oscillation synchronization signal TR) indicating that the Np-th continuous pulse oscillation has ended from the laser controller 6 to the exposure device controller 13, or by letting the exposure device controller 13 know in advance the cycle tp of the laser oscillation synchronization signal TR produced on the laser controller 6 side.

When a continuous pulse oscillation end signal is transmitted from the laser controller 6 to the exposure device controller 13, the exposure device controller 13 can judge that the instant when the time t3 has passed from the instant when the continuous pulse oscillation end signal was received is the timing at which the next burst-on signal BS' is sent.

Further, when the cycle $\Delta$tp of the laser oscillation synchronization signal TR produced on the laser controller 6 side is known in advance by the exposure device controller 13, a judgment can be made that the instant when a time Tz, given in the following equation, has passed from the instant when the burst-on signal BS' was produced is the timing at which the next burst-on signal BS' is sent.

$$Tz = t1 + \Delta tp(Np-1) + t3$$

It should be noted that, in this third embodiment, the computational equation for computing the true oscillation-stopping time Tpp carried out in Step 210 of FIG. 3 or Step 201 of FIG. 6 above is as given in the following equation.

$$Tpp = t1 + t3$$

Thus, in this third embodiment, only the burst-on signal BS' is transmitted, and the burst-off signal is omitted.

It should be noted that, in each of the abovementioned embodiments, the arrangement was such that the charge voltage data stored in a charge voltage data table was corrected based on the pulse energy monitored values of the continuous pulse oscillation of the preceding cycle, but, depending on the exposure precision, the arrangement may be such that charge voltage control is carried out using the stored data of the charge voltage data table directly, without carrying out this correction.

Further, in each of the abovementioned embodiments, the arrangement was such that the charge voltage data stored in the charge voltage data table was corrected based on the pulse energy monitored values from the continuous pulse oscillation of the preceding cycle, but the arrangement may be such that data from an even earlier continuous pulse oscillation is used. Further, the arrangement may be such that the correction process is carried out based on data from two or more continuous pulse oscillations, and not data from a single continuous pulse oscillation.

Further, in each of the abovementioned embodiments, the arrangement was such that the laser excitation strength or discharge voltage was varied by controlling the charge voltage, but the excitation strength or discharge voltage may be controlled using another technique. For example, in the case of a YAG laser, the strength of the light of a flash lamp may be controlled.

Further, a single IC chip on a wafer may be exposed during the period of one burst from burst-on to burst-off, but a plurality of IC chips may be exposed during this period of a single burst.

Further, in each of the abovementioned embodiments, the laser device was arranged so as to measure the cumulative pulse energy and send this cumulative pulse energy to the exposure device, but it may also be arranged in such a way that the average pulse energy, obtained by dividing the cumulative pulse energy by the number of pulses within a single burst, is sent to the exposure device. Further, when a scan system is involved, the cumulative value of the moving cumulative pulse energy may be used. Further, parameter values other than pulse energy, for example the target wavelength or the like, may be sent.

Further, in each of the abovementioned embodiments, the arrangement was such that the charge voltage value for the first pulse oscillation is computed in the period from when the abovementioned burst signal BS turns on until the first laser oscillation synchronization signal TR is received, and computations of the excitation strengths of pulse oscillations from the second onward are carried out in the periods from when a laser oscillation synchronization signal is received until the next laser oscillation synchronization signal is received, but the arrangement may also be such that the charge voltage values of all of the pulse oscillations of the current continuous pulse oscillation are calculated in the period from when the burst signal BS turns on until the first laser oscillation synchronization signal TR is received.

Further, in each of the abovementioned embodiments, the exposure device 20 did not send a charge signal to the excimer laser 1, but it may send a charge signal. In this case, the charge signal may be sent after a predetermined time from when the burst signal turns on, and then a laser oscillation synchronization signal TR may be sent as an external trigger. In the excimer laser 1, charging of the charge capacitor is carried out after the charge signal has been received.

Further, in the abovementioned first and second embodiments, the arrangement was such that burst-on and burst-off are represented by a single burst signal BS, but the arrangement may be such that separate signal lines are used as the burst-on signal and burst-off signal.

Further, this invention may be arranged so as to be applied in a processing device other than an exposure device provided that it is one which carries out work based on a laser.

Further, in the abovementioned embodiments, the arrangement may be such that, when the oscillation-stopping time Tpp is extremely long (for example one hour or longer), an adjustment oscillation (laser oscillation carried out with the laser suitably screened so that the laser output does not fall incident upon the exposure device 20) is carried out during this oscillation-stopping time, the predetermined target pulse energy Pd is compared with the various pulse energy monitor results of the abovementioned adjustment oscillation during a later continuous pulse oscillation, and the optimum charge voltage values stored in the voltage data table are corrected in accordance with the results of this comparison.

Further, this invention can be applied to exposure devices of both the stepper type and scan type.

INDUSTRIAL APPLICABILITY

As described above, according to this invention, the laser device is arranged so as to perform control relating to the burst operation using the burst-on signal and burst-off signal sent from the working device side, and, therefore, if laser oscillation synchronization signal acting as a trigger signal for a continuous pulse oscillation is transmitted after the burst-on signal, and a burst-off signal is transmitted after the laser oscillation synchronization signal, it is possible to carry out a computation for the excitation strength from the instant when the burst-on signal is input until the instant when the first laser oscillation synchronization signal is input, and thus there are the following advantages.

(a) It is safe as the power source circuit is controlled and there is no need to supply high voltages during laser oscillation-stopping time.

(b) The calculation of the timing of the stopping time can be accurately carried out and the controllability of the spiking prevention control is improved.

(c) There is no need to carry out a computation for charge voltage control in the oscillation-stopping time, and there are no adverse effects on the responsiveness and speed of control of various other control tasks to be carried out during this stopping time.

Further, because the arrangement in this invention is such that the target energy value for the continuous pulse oscillation set in advance is corrected using the results of comparisons between the laser monitor output on the processing device side and the laser monitor output on the laser device side, and laser output constancy control is performed using the corrected target energy value as the target value, it follows that variations in the transmittance of the laser output and variations in the laser output monitor are canceled, and accurate and highly precise laser output constancy control can be achieved.

What is claimed is:

1. A laser processing device comprising: a laser device for carrying out, based on a received laser oscillation synchronization signal, a burst mode operation involving alternate repetition of a continuous oscillation operation wherein laser light is continuously subjected to pulse oscillation in a predetermined cycle for a predetermined number of times, and a stopping operation wherein the continuous pulse oscillation is stopped for a predetermined time after the continuous oscillation operation; and a processing device for transmitting the laser oscillation synchronization signal to the laser device and performing a predetermined type of work or exposure by means of the laser light produced by the laser device, wherein:

the processing device comprises burst-on/off signal transmitting means which produces a burst-on signal produced a predetermined time before output of a first laser oscillation synchronization signal, for starting the continuous oscillation operation, and a burst-off signal produced a predetermined time after output of a last laser oscillation synchronization signal of the continuous pulse oscillation, for stopping the continuous oscillation operation and starting the stopping operation, and transmits the burst on and -off signals to the laser device, and the laser device comprises control means which receives the burst-on signal and the burst-off signal and performs control relating to the burst operation using these signals.

2. The laser processing device according to claim 1, wherein the control means comprises computation means which computes an excitation strength of each pulse oscillation, in a current continuous pulse oscillation, in a period from when the burst-on signal is received until the first laser oscillation synchronization signal is input.

3. The laser processing device according to claim 1, wherein the control means comprises computation means which computes an excitation strength of a first pulse oscillation in a current continuous pulse oscillation, in a period from when the burst-on signal is received until the first laser oscillation synchronization signal is input, and which computes an excitation strength of a second pulse oscillation onward in a period from when one laser oscillation synchronization signal is input until a next laser oscillation synchronization signal is input.

4. A laser processing device comprising: a laser device for carrying out, based on a laser oscillation synchronization signal produced inside thereof, a burst mode operation involving alternate repetition of a continuous oscillation wherein laser light is continuously subjected to pulse oscillation in a predetermined cycle for a predetermined number of times, and a stopping operation wherein the continuous pulse oscillation is stopped for a predetermined time after the continuous oscillation operation; and a processing device for performing a predetermined type of work or exposure by means of the laser light produced by the laser device, wherein:

the processing device comprises burst-on/off signal transmitting means which produces a burst-on signal for starting the continuous oscillation operation, and a burst-off signal for stopping the continuous oscillation operation and starting the stopping operation, and which transmits the burst-on and -off signals to the laser device, and the laser device comprises control means which receives the burst-on signal and the burst-off signal, performs control relating to the burst operation using these signals, and produces a first laser oscillation synchronization signal at an instant when a predetermined time has passed after receipt of the burst-on signal.

5. A laser device which carries out a burst mode operation involving alternate repetition of a continuous oscillation operation wherein laser light is continuously subjected to pulse oscillation in a predetermined cycle for a predetermined number of times and a stopping operation in which the continuous pulse oscillation is stopped for a predetermined time after the continuous oscillation operation, using a laser oscillation synchronization signal input from an external device as a trigger, wherein the laser device comprises:

control means which receives, from the external device, a burst-on signal produced a predetermined time before the output of a first laser oscillation synchronization signal, for starting the continuous oscillation operation, and a burst-off signal produced a predetermined time after the output of a last laser oscillation synchronization signal of the continuous pulse oscillation, for stopping the continuous oscillation operation and starting the stopping operation, and performs control relating to the burst operation using these signals.

6. A laser processing device which performs a predetermined work or exposure by means of a laser light produced by a laser device which carries out a burst mode operation involving alternate repetition of a continuous oscillation operation wherein the laser light is continuously subjected to pulse oscillation in a predetermined cycle for a predetermined number of times, and a stopping operation wherein the continuous pulse oscillation is stopped for a predetermined time after the continuous oscillation operation, and which transmits a laser oscillation synchronization signal as a trigger signal for the burst operation to the laser device, wherein the laser processing device comprises:

burst-on/off signal transmission means which produces a burst-on signal produced a predetermined time before output of a first laser oscillation synchronization signal, for starting the continuous oscillation operation, and a burst-off signal produced a predetermined time after output of a last laser oscillation synchronization signal of the continuous pulse oscillation, for stopping the continuous oscillation operation and starting the stopping operation, and transmits these signals to the laser device.

7. A laser processing device comprising: a laser device for carrying out, based on a received laser oscillation synchronization signal, a burst mode operation involving alternate repetition of a continuous oscillation operation wherein laser light is continuously subjected to pulse oscillation in a predetermined cycle for a predetermined number of times, and a stopping operation wherein the continuous pulse oscillation is stopped for a predetermined time after the continuous oscillation operation; and processing device for transmitting the laser oscillation synchronization signal to the laser device and performing a predetermined work or exposure by means of the laser light produced by the laser device, wherein:

the processing device comprises burst-on signal transmitting means which produces a burst-on signal for starting the continuous oscillation operation, the burst-on signal being produced a predetermined time before output of a first laser oscillation synchronization signal, and which transmits the burst-on signal to the laser device, and the laser device comprises control means which receives the burst-on signal and performs control relating to the burst operation using this signal.

8. The laser processing device according to claim 7 wherein the control means comprises computation means which computes an excitation strength of each pulse oscillation, of a current continuous pulse oscillation, in a period from when the burst-on signal is received until the first laser oscillation synchronization signal is input.

9. The laser processing device according to claim 7 wherein the control means comprises computation means which computes an excitation strength of a first pulse oscillation during the current continuous pulse oscillation, in a period from when the burst-on signal is received until the first laser oscillation synchronization signal is input, and which computes excitation strengths of a second pulse oscillation onward within a period from a time when one laser oscillation synchronization signal is input until a next laser oscillation synchronization signal is input.

10. A laser processing device comprising: a laser device for carrying out, based on a laser oscillation synchronization signal produced inside thereof, a burst mode operation involving alternate repetition of a continuous oscillation operation wherein laser light is continuously subjected to pulse oscillation in a predetermined cycle for a predetermined number of times, and a stopping operation wherein the continuous pulse oscillation is stopped for a predetermined time after the continuous oscillation operation; and a processing device for performing a predetermined work or exposure by means of the laser light produced by the laser device, wherein:

the processing device comprises burst-on signal transmitting means which produces a burst-on signal for starting the continuous oscillation operation and transmits the burst-on signal to the laser device, and the laser device comprises control means which receives the burst-on signal, performs control relating to the burst operation using this signal, and produces a first laser oscillation synchronization signal at an instant when a predetermined time has passed after receipt of the burst-on signal.

11. A laser device which carries out a burst mode operation involving alternate repetition of a continuous oscillation operation wherein laser light is continuously subjected to pulse oscillation in a predetermined cycle for a predetermined number of times, and a stopping operation wherein the continuous pulse oscillation is stopped for a predetermined time after the continuous oscillation operation, using a laser oscillation synchronization signal input from an external device as a trigger, wherein the laser device comprises:

control means which receives, from the external device, a burst-on signal produced a predetermined time before output of a first laser oscillation synchronization signal, for starting the continuous oscillation operation, and performs control relating to the burst operation using this signal.

12. A laser processing device which performs a predetermined work or exposure by means of laser light produced by a laser device which carries out a burst mode operation involving alternate repetition of a continuous oscillation operation wherein the laser light is continuously subjected to pulse oscillation in a predetermined cycle for a predetermined number of times, and a stopping operation wherein the continuous pulse oscillation is stopped for a predetermined time after the continuous oscillation operation, and which transmits as a trigger signal for the burst operation a laser oscillation synchronization signal to the laser device, wherein the laser processing device comprises:

burst-on signal transmission means which produces a burst-on signal for starting the continuous oscillation operation in the laser device, the burst-on signal being produced a predetermined time before output of a first laser oscillation synchronization signal, and transmits this signal to the laser device.

13. A laser processing device comprising: a laser device which carries out a burst mode operation involving alternate repetition of a continuous oscillation operation wherein laser light is continuously subjected to pulse oscillation for a predetermined number of times and a stopping operation wherein the continuous pulse oscillation is stopped for a predetermined time after the continuous oscillation operation; and a processing device which performs a predetermined work or exposure by means of the laser light produced by the laser device, wherein:

the laser device comprises:
first monitor means which monitors an energy of the pulse-oscillated laser light, and
first energy computation means which determines a cumulative energy or an average energy of output laser light during the continuous oscillation operation based on output of the first monitor means, and transmits the cumulative energy value or average energy to the processing device;

the processing device comprises:
second monitor means which monitors an energy of the laser light input to the processing device,
second energy computation means which determines a cumulative energy or an average energy of input laser light based on output of the second monitor means, and
target energy correction means which corrects a target energy value of the continuous pulse oscillation, which has been set in advance, by means of the energy value transmitted from the first energy computation means and the energy value computed by the second energy computation means, and transmits the corrected target energy value to the laser device; and the laser device further comprises:
control means which carries out laser output control using the received corrected target energy value as a target value.

14. The laser processing device according to claim 13, wherein the transmission of the corrected target energy value by means of the target energy computation means of the processing device is carried out during the stopping operation.

15. A laser device for carrying out, based on a laser oscillation synchronization signal produced inside thereof as a trigger, a burst mode operation involving alternate repetition of a continuous oscillation operation wherein laser light is continuously subjected to pulse oscillation in a predetermined cycle for a predetermined number of times, and a stopping operation wherein the continuous pulse oscillation is stopped for a predetermined time after the continuous oscillation operation, wherein the laser device comprises;

control means which receives, from an external device, a burst-on signal for starting the continuous oscillation operation, and a burst-off signal for stopping the continuous oscillation operation and starting the stopping operation, performs control relating to the burst operation using these signals, and produces a first laser oscillation synchronization signal at an instant when a predetermined time has passed after receipt of the burst-on signal.

16. A laser device for carrying out, based on a laser oscillation synchronization signal produced inside thereof as a trigger, a burst mode operation involving alternate repetition of a continuous oscillation operation wherein laser light is continuously subjected to pulse oscillation in a predetermined cycle for a predetermined number of times, and a stopping operation wherein the continuous pulse oscillation is stopped for a predetermined time after the continuous oscillation operation, wherein the laser device comprises:

control means which receives, from an external device, a burst-on signal for starting the continuous oscillation operation, performs control relating to the burst operation using this signal, and produces a first laser oscillation synchronization signal at an instant when a predetermined time has passed after receipt of the burst-on signal.

* * * * *